United States Patent
Jensen

(10) Patent No.: US 10,808,683 B2
(45) Date of Patent: Oct. 20, 2020

(54) VORTEX-SHEDDING-ARRANGEMENT

(71) Applicant: Siemens Gamesa Renewable Energy A/S, Brande (DK)

(72) Inventor: Anders Hoejris Jensen, Herning (DK)

(73) Assignee: Siemens Gamesa Renewable Energy A/S (DK)

( * ) Notice: Subject to any disclaimer, the term of this patent is extended or adjusted under 35 U.S.C. 154(b) by 0 days.

(21) Appl. No.: 16/346,653

(22) PCT Filed: Oct. 30, 2017

(86) PCT No.: PCT/EP2017/077731
§ 371 (c)(1),
(2) Date: May 1, 2019

(87) PCT Pub. No.: WO2018/083054
PCT Pub. Date: May 11, 2018

(65) Prior Publication Data
US 2020/0056593 A1 Feb. 20, 2020

(30) Foreign Application Priority Data

Nov. 7, 2016 (EP) .................................... 16197511
Jan. 19, 2017 (DE) ........................ 10 2017 200 814

(51) Int. Cl.
*F03D 13/10* (2016.01)
*F15D 1/12* (2006.01)
(Continued)

(52) U.S. Cl.
CPC ............ *F03D 13/20* (2016.05); *E04H 12/00* (2013.01); *F03D 13/10* (2016.05); *F15D 1/12* (2013.01);
(Continued)

(58) Field of Classification Search
CPC . F03D 13/20; F03D 13/10; F15D 1/12; E04H 12/00; F05B 2240/912;
(Continued)

(56) References Cited

U.S. PATENT DOCUMENTS 3,448,585 A * 6/1969 Vogelsang ................ E02D 5/60
405/216
4,180,369 A * 12/1979 Ottosen ..................... F03D 1/00
415/208.1
(Continued)

FOREIGN PATENT DOCUMENTS

| CN | 1775522 A | 5/2006 |
| CN | 101344068 A | 5/2012 |

(Continued)

OTHER PUBLICATIONS

International Search Report dated Feb. 19, 2018 for Application No. PCT/EP2017/077731.
(Continued)

*Primary Examiner* — Brent W Herring
(74) *Attorney, Agent, or Firm* — Schmeiser, Olsen & Watts LLP

(57) ABSTRACT

A Vortex-shedding-arrangement, which is prepared to be arranged on a tower of a wind turbine, is provided. Embodiments of the invention even relate to a tower, which is equipped with the Vortex-shedding-arrangement and to a method to equip the tower with the Vortex-shedding-arrangement.
The Vortex-shedding-arrangement according to embodiments of the invention is arranged and prepared to be connected to a surface of a tower. The Vortex-shedding-arrangement is prepared to reduce Vortex-induced-vibrations, acting on the tower and its structure, during the tower-transportation. The vortex shedding arrangement comprises vortex shedding elements and at least one shrink
(Continued)

foil. The at least one shrink foil is prepared to fix and to position the vortex shedding elements at specific positions at the tower surface by heat applied to the shrink foil.

18 Claims, 3 Drawing Sheets

(51) Int. Cl.
  *F03D 13/20* (2016.01)
  *E04H 12/00* (2006.01)
(52) U.S. Cl.
  CPC ....... *F05B 2230/40* (2013.01); *F05B 2230/90* (2013.01); *F05B 2240/912* (2013.01); *F05B 2250/11* (2013.01); *F05B 2250/232* (2013.01); *F05B 2250/25* (2013.01); *F05B 2260/96* (2013.01); *F05B 2280/4003* (2013.01); *F05B 2280/6012* (2013.01)
(58) Field of Classification Search
  CPC .............. F05B 2260/96; F05B 2230/40; F05B 2250/25; F05B 2230/90; F05B 2280/4003; F05B 2280/6012; F05B 2250/232; F05B 2250/11
  USPC .......... 52/651.01, 2.11, 698, 590.3; 405/211, 405/216; 114/243
  See application file for complete search history.

(56) References Cited

U.S. PATENT DOCUMENTS

| | | | | |
|---|---|---|---|---|
| 5,138,806 A * | 8/1992 | Marx | ................... | B27K 3/0235 106/18.3 |
| 5,891,583 A * | 4/1999 | George | ............... | B29C 61/0616 156/337 |
| 6,019,549 A * | 2/2000 | Blair | ....................... | E01D 19/02 24/460 |
| 6,347,911 B1 * | 2/2002 | Blair | ....................... | E01D 19/02 24/462 |
| 6,695,540 B1 * | 2/2004 | Taquino | ................... | E21B 17/01 405/216 |
| 6,896,447 B1 * | 5/2005 | Taquino | ................... | E21B 17/01 405/216 |
| 7,458,752 B2 * | 12/2008 | Esselbrugge | ......... | B63B 21/502 405/216 |
| 7,600,945 B2 * | 10/2009 | Burgess | ................ | B63B 21/502 405/216 |
| 8,511,245 B2 * | 8/2013 | Dehne | .................... | E21B 17/01 114/243 |
| 8,770,894 B1 * | 7/2014 | Allen | ........................ | F15D 1/10 405/211.1 |
| 8,944,722 B1 * | 2/2015 | Allen | ................... | E02B 17/0017 405/216 |
| 9,140,385 B2 * | 9/2015 | Meijer | .................. | B63B 21/663 |
| 9,416,557 B2 * | 8/2016 | Moeller | ................. | E04H 12/28 |
| 9,511,825 B1 * | 12/2016 | Henning | ............... | E21B 17/006 |
| 9,534,415 B2 * | 1/2017 | Moeller | ................. | E04H 12/28 |
| 9,567,745 B2 * | 2/2017 | Moeller | .................. | E04B 1/40 |
| 9,869,128 B1 * | 1/2018 | Allen | ..................... | E21B 17/01 |
| 10,337,649 B1 * | 7/2019 | Dehne | ................... | E21B 17/012 |
| 2006/0104817 A1 | 5/2006 | Bonnet | | |
| 2006/0153642 A1 * | 7/2006 | Esselbrugge | ......... | B63B 21/502 405/216 |
| 2006/0277843 A1 * | 12/2006 | Livingston | .............. | E04H 12/10 52/110 |
| 2007/0231077 A1 * | 10/2007 | Burgess | ................ | B63B 21/502 405/216 |
| 2009/0016891 A1 | 1/2009 | Parsania et al. | | |
| 2011/0133683 A1 | 6/2011 | Lechte et al. | | |
| 2011/0268558 A1 | 11/2011 | Driver et al. | | |
| 2012/0291687 A1 * | 11/2012 | Dehne | ..................... | F16L 1/123 114/271 |
| 2013/0280027 A1 * | 10/2013 | Francisco | ............... | F01D 25/30 415/1 |
| 2015/0082743 A1 * | 3/2015 | Moeller | .................. | E04H 12/28 52/857 |
| 2015/0086276 A1 * | 3/2015 | Harbison | .................. | F15D 1/12 405/216 |
| 2016/0160499 A1 * | 6/2016 | Moeller | ..................... | E04B 1/40 52/2.11 |
| 2016/0312761 A1 * | 10/2016 | Moeller | .................. | E04H 12/28 |
| 2018/0208302 A1 | 7/2018 | Schaube et al. | | |
| 2020/0002939 A1 * | 1/2020 | Enevoldsen | .............. | E04B 1/98 |

FOREIGN PATENT DOCUMENTS

| | | |
|---|---|---|
| CN | 102458839 A | 5/2012 |
| CN | 102536639 A | 7/2012 |
| CN | 105673351 A | 6/2016 |
| EP | 3029313 A1 | 6/2016 |
| WO | 9819018 A1 | 5/1998 |

OTHER PUBLICATIONS

Chinese Office Action for Application No. 201780068788.1, dated Mar. 18, 2020.
Daquan, Shipin Baozhuang: Zhongguo Qinggongye Chubanshe; Food; pp. 1-7; ISBN 7-5019-2564-X.

* cited by examiner

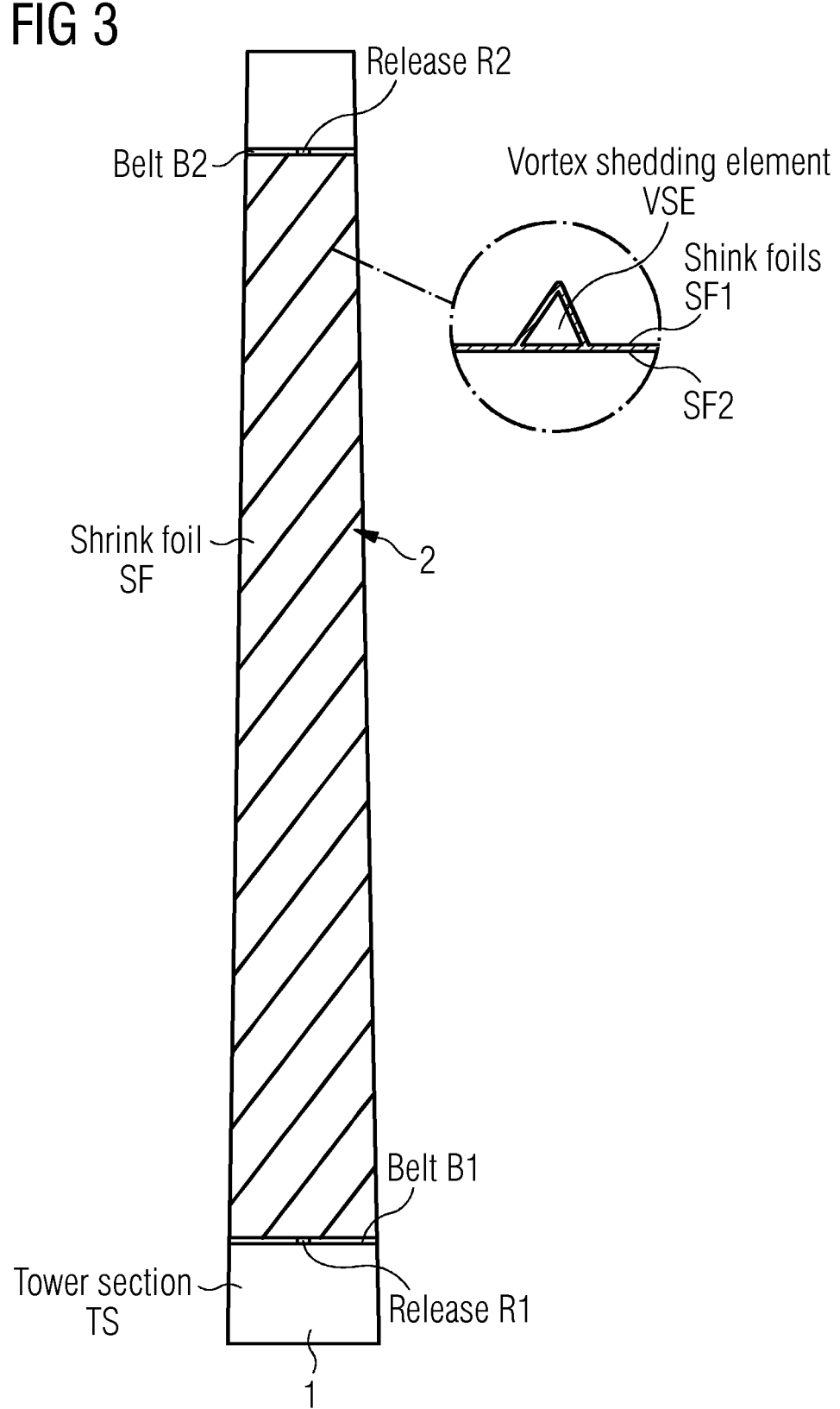

VORTEX-SHEDDING-ARRANGEMENT

CROSS-REFERENCE TO RELATED APPLICATIONS

This application claims priority to PCT Application No. PCT/EP2017/077731, having a filing date of Oct. 30, 2017, which is based off of DE Application No. 10 2017 200 814.8, having a filing date of Jan. 19, 2017, and EP Application No. 16197511.5, having a filing date of Nov. 7, 2016, the entire contents all of which are hereby incorporated by reference.

FIELD OF TECHNOLOGY

The following relates to a Vortex-shedding-arrangement, which is prepared to be arranged on a tower of a wind turbine. Embodiments of the invention even relate to a tower, which is equipped with the Vortex-shedding-arrangement and to a method to equip the tower with the Vortex-shedding-arrangement.

BACKGROUND

A wind turbine comprises rotor blades, which are driven by the wind. The rotor-blades are connected via a turning hub with a nacelle. The turning rotor-blades drive an electrical generator via a so called main shaft. Generator and shaft are arranged in the housing of the nacelle. The nacelle is arranged on top of a tower of the wind turbine.

For the installation of the wind turbine at the respective wind turbine site several production steps might be done as described below as an example:

The nacelle of the wind turbine is equipped at a production site with all components necessary, i.e. with a housing, a main-shaft, a generator, a cooling-system, with power electronics and with control equipment and with other devices, etc.

The ready-made nacelle is transported to the wind turbine site, together with the rotor blades and with the hub. Even the tower is transported to the wind turbine site. The tower may be segmented, due to its overall length and due to transport limitations.

At the wind turbine site, the bottom end of the tower is connected with a tower-foundation. If the tower is segmented the respective segments of the tower are piled vertically on the bottom end until the whole tower is erected and completed. The nacelle is lifted on top of the tower and is connected there. Hub and rotor blades are lifted and connected to the nacelle.

The tower or its segments are often manufactured at a production site, which is different than the wind turbine site. The tower or its segments might be transported standing in an upright position (thus the tower or its segment is oriented vertically in view to the respective length-axis) from the production site to the wind turbine site. This is done, for example, if the wind turbine is installed offshore: all parts of the wind turbine (i.e. tower (or its segments), nacelle, hub, blades, other equipment, etc.) are transported by special ships to the offshore installation site, while the tower is stored on the ship in an upright position as given above.

During the transportation wind is acting on the tower. The respective wind forces are even acting via the tower, which can be seen as a lever, into the tower-connection and transportation means being part of the ship. The wind induces vibrations into the tower, which are commonly called and known as "vortex induced vibrations, VIV". The vortex induced vibrations might be strong enough to damage the tower and its structural strength. The vortex induced vibrations may even damage the transport equipment of the tower, being an integrated part of the ship. The vortex induced vibrations may even create trouble during the installation of the tower as the tower might start to swing and vibrate creating severe danger for the mounting personal.

The vortex induced vibrations result from alternating vortex shedding originated by critical wind conditions in view to the circumference of the tower. Vortex results from alternating pressure differences along the surface of the tower and in relation to its cross section.

Several measures are known to dampen vortex induced vibrations.

Document EP 3 029 313 A1 describes a Vortex-shedding-arrangement, which is called "strake", for a wind turbine tower. The strake is mounted to a wind turbine tower and can be detached after the installation of the wind turbine and its tower. The strake is shaped in a way that vortex induced vibrations during transportation and installation of the wind turbine is reduced. A mounting bracket, which is attached to the wind turbine tower, a leg and operation means are used to attach the strake to the tower. One end of the strake is attached via the leg to the operation means. The means and the leg are rotatable in respect to the mounting bracket in a way that the strake, which is connected to the leg, is wrapped around the tower if the leg is rotated in respect to the mounting bracket. The strake is installed at the tower of the wind turbine before the tower is shipped to the installation site. After the installation is completed the strake is detached from the wind turbine tower.

This idea shows a number of disadvantages: The strake is mounted by using a rope, which is located and arranged into the strake. As the strake is only placed on a top third of the tower the rope is still present all the way down from the top of the tower down to its base. The rope is tied there at an anchor point. The rope must be secured and controlled during the transportation, while the whole mount- and dismount-proceeding of the strake is complicated and time-consuming as well. During erection of the wind turbine tower at site, the strakes also have a tendency to fall off which is not desirable and may cause the tower to start vibrate. These vibrations complicate to a great extent mounting of the nacelle on top the tower.

SUMMARY

An aspect relates to provide an improved Vortex-shedding-arrangement, which can be mounted and dismounted quite easily, and which does not need extensive control during the transportation.

Throughout the description of embodiments of the invention the phrase "tower" refers to a tower segment as well as to a completed tower, which might in turn comprise a number of tower segments connected to one another. Due to the length of tower segments in modern wind turbines the segments might be influenced by VIV accordingly.

Embodiments of the invention relate to a Vortex-shedding-arrangement, which is prepared to be arranged on a tower of a wind turbine. Embodiments of the invention even relate to a tower, which is equipped with the Vortex-shedding-arrangement and to a method to equip the tower with the Vortex-shedding-arrangement.

The Vortex-shedding-arrangement according to embodiments of the invention is arranged and prepared to be connected to a surface of a tower. The Vortex-shedding-arrangement is prepared to reduce Vortex-induced-vibrations (VIV), acting on the tower and its structure, during the tower-transportation or tower installation. The vortex shedding arrangement comprises vortex shedding elements and at least one shrink foil. The shrink foil is prepared to fix and to position the vortex shedding elements at specific positions at the tower surface by heat applied to the shrink foil.

Embodiments of the invention are especially directed towards wind turbine towers with a lower stiffness than usual, which are exposed to increased vibrations induced into the tower and its structure due to wind vortexes.

Embodiments of the invention could be applied to offshore and onshore towers as well.

Embodiments of the invention do not need a tower flange or a fixed point on the tower, to keep the tower during transportation in its respective place.

Embodiments of the invention use the strength of the shrink foils (being used as wrapping material) and the circular shape around the tower to stay in place.

Embodiments of the invention use the conical shape of the tower to stay in place.

The claimed vortex shedding arrangement can be dismounted without a crane. Only a lowering mechanism is needed.

Embodiments of the invention provide a temporarily mounted vortex shedding solution, which can be mounted on any tower quite easily with low efforts and costs.

Embodiments of the invention can be applied to any mast of a wind turbine regardless of the swinging mass and frequency.

BRIEF DESCRIPTION

Some of the embodiments will be described in detail, with reference to the following figures, wherein like designations denote like members, wherein:

FIG. 3 shows further details of the vortex shedding arrangement according to embodiments of the invention.

DETAILED DESCRIPTION

Figure 1:
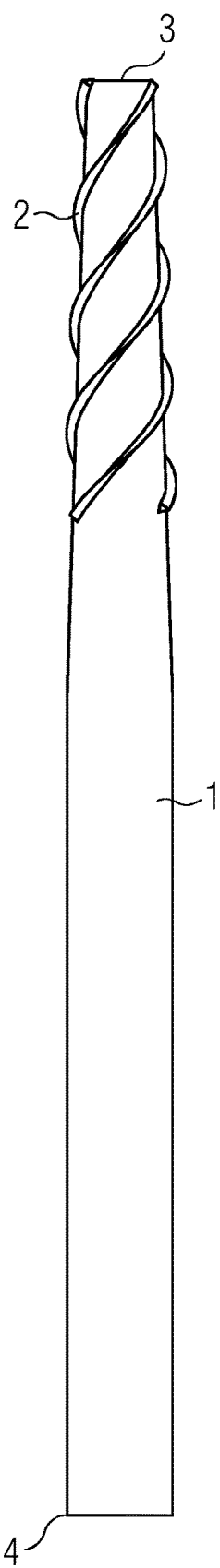
FIG. 1 shows a wind turbine tower with an attached vortex shedding arrangement.

FIG. 1 shows a wind turbine tower 1 with an attached vortex shedding arrangement 2.

The vortex shedding arrangement 2 is shaped in a way that Vortex induced vibrations (VIV) during the installation and transportation of the wind turbine tower are reduced.

The wind turbine tower 1 comprises a top end 3 and a bottom end 4. The vortex shedding arrangement 2 is attached to the tower 1 from the top end 3 of the tower 1 towards the bottom end 4 of the tower 4.

The upper first third part of the length of the tower 1 is fitted with the vortex shedding arrangement 2.

A wind turbine tower 1, which is used for an offshore wind turbine installation site, is transported in an upright position from the harbor towards the installation site of the wind turbine by ship.

As described above strong wind is acting on the wind turbine tower 1, which starts to vibrate. The wind flows along the sides of the wind turbine tower 1 in a non-laminate structure. Thus, vortexes are generated in the wind shadow of the wind turbine tower 1.

This vortex wind structures lead to vortex induced vibrations, influencing the tower 1 and its structure. The vortex induced vibrations are reduced by vortex shedding arrangement 2, which is arranged and attached along the surface of the tower 1.

The vortex shedding arrangement 2 are only needed during transportation and installation of the wind turbine tower. They are disassembled from the tower 1 before the power-generating operation of the wind turbine is started.

Figure 2:
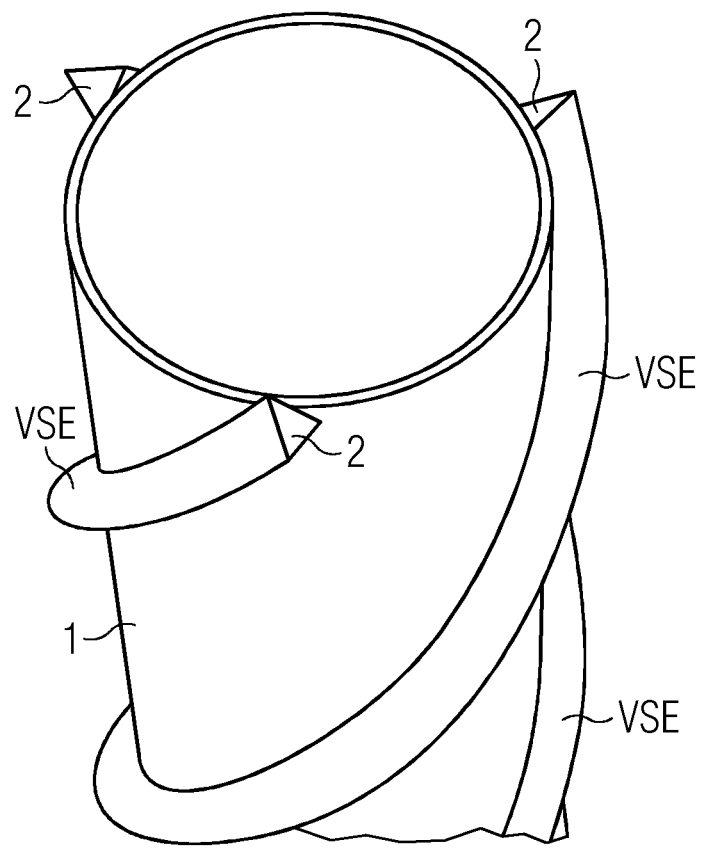
FIG. 2 shows a detailed view to the vortex shedding arrangement in reference to FIG. 1.

FIG. 2 shows a detailed view to the vortex shedding arrangement 2 in reference to the tower 1, referring to FIG. 1.

The vortex shedding arrangement 2 is attached to a wind turbine tower 1. The vortex shedding arrangement 2 consists of three vortex shedding elements VSE, which are wrapped around the wind turbine tower 1 in an equally distributed manner.

In an exemplary configuration each of the vortex shedding elements VSE of the vortex shedding arrangement 2 show a triangular shaped cross-section.

The angle of inclination of the longitudinal axis of the vortex shedding element VSE in respect to the longitudinal axis of the wind turbine tower is in a range between 10° and 80°.

FIG. 3 shows further details of the vortex shedding arrangement according to embodiments of the invention.

A tower section TS of the tower 1 is equipped with the vortex shedding arrangement 2. The tower 1 is shaped like a conical cylinder in this example.

In a first exemplary configuration the vortex shedding arrangement 2 comprises two shrink foils SF1, SF2 as well as three elongated vortex shedding elements VSE.

The vortex shedding elements VSE are made of "Polyethylene, PE".

In another exemplary configuration the vortex shedding elements VSE are made of foam, preferably made of lightweight foam.

The vortex shedding elements VSE are arranged between the two shrink foils SF1, SF2. The shrink foils SF1, SF2 are used as wrapping material or as an envelope of the vortex shedding elements VSE. The shrink foils SF1, SF2 are welded together thus the vortex shedding elements VSE are fixed in their respective positions.

The vortex shedding arrangement 2, comprising the shrink foils SF1, SF2 and the vortex shedding elements VSE, is put in place at the tower 1.

The vortex shedding arrangement 2 is fixed by a first belt B1 close to the upper part of the tower 1, while the vortex shedding arrangement 2 is fixed by a second belt B2 close to the lower part of the tower 1.

Next heat is applied to the shrink foils SF1, SF2. Thus, the whole vortex shedding arrangement 2 is put into shape in view to the surface of the tower 1 by the applied heat.

The vortex shedding arrangement 2 is additionally secured tightly around the tower by the shrinking foils and the applied heat.

For dismounting of the vortex shedding arrangement 2 from the tower both belts B1, B2 may be removed by using respective releases R1 and R2, arranged in the belts B1 and B2.

Finally a cutting device (like a knife, a cutting string, etc.) is used to cut in vertical direction along the tower surface in a way that the vortex shedding arrangement 2 is split its circular cross section is opened by the vertical cut and the vortex shedding arrangement 2 can be removed from the tower 1 easily by only one vertical cut.

In another exemplary configuration the vortex shedding elements are mounted on the shrink foil SF1 by using an adhesive tape or by using welding.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A vortex-shedding-arrangement, wherein:
the vortex-shedding-arrangement is arranged and prepared to be connected to a surface of a tower,
the vortex-shedding-arrangement is prepared to reduce vortex-induced-vibrations, acting on the tower and its structure, wherein the vortex shedding arrangement comprises vortex shedding elements and two shrink foils,
wherein the vortex shedding elements are connected with the two shrink foils such that the vortex shedding elements are positioned between the two shrink foils, and wherein the two shrink foils are welded together to envelope the vortex shedding elements, and
wherein the two shrink foils are prepared to fix and to position the vortex shedding elements at specific positions at the tower surface by heat applied to the two shrink foils.

2. The arrangement according to claim 1, wherein the vortex shedding elements have a triangular shaped cross-section.

3. The arrangement according to claim 1, wherein the angle of inclination of the longitudinal axis of the vortex shedding element in respect to the longitudinal axis of the tower is in a range between 10° and 80°.

4. The arrangement according to claim 1, wherein the vortex shedding elements are made of polyethylene or wherein the vortex shedding elements are made of foam.

5. A tower with a vortex-shedding-arrangement according to claim 1,
wherein the vortex-shedding-arrangement is connected to a surface of a tower at a predefined position, and
wherein the vortex-shedding-arrangement is prepared and arranged to reduce vortex-induced-vibrations, acting on the tower and its structure, during the tower-transportation and/or installation.

6. A tower according to claim 5, wherein the vortex shedding arrangement is put in place at a specific section of the tower.

7. The tower according to claim 6, wherein the vortex shedding arrangement is at least one of fixed by a first belt close to the upper part of the tower section, and fixed by a second belt close to the lower part of the tower section.

8. The tower according to claim 5, wherein the vortex shedding arrangement is attached to the tower surface between the top end of the tower and the bottom end of the tower.

9. The tower according to claim 5, wherein the upper third of the length of the tower is equipped with the vortex shedding arrangement.

10. The tower according to claim 5, wherein the tower is a wind turbine tower of an onshore or of an offshore wind turbine and/or wherein the tower is shaped like a truncated cone.

11. A method to equip a tower, with a vortex-shedding-arrangement comprising,
providing a vortex shedding arrangement and two shrink foils attached together,
wherein the vortex shedding arrangement is positioned between the two shrink foils;
exposing the vortex shedding arrangement to heat applied to the two shrink foils,
shaping the vortex shedding arrangement in view to the surface of the tower by the applied heat at specific positions at the tower surface, and
thus connecting the vortex-shedding-arrangement to the surface of the tower and thus vortex-induced-vibrations, acting on the tower and its structure during transportation, are reduced.

12. The method according to claim 11, wherein the vortex-shedding-arrangement is removed from the tower after the transportation or installation of the tower.

13. The method according to claim 11, wherein the tower is transported in an upright and vertical position from a harbor towards an installation site of the tower by ship.

14. A vortex-shedding-device for reducing vortex-induced-vibrations acting on a tower, comprising:
at least one vortex shedding element;
a first shrink foil; and
a second shrink foil;
wherein the at least one vortex shedding element is arranged and positioned between the first shrink foil and the second shrink foil;
wherein the first shrink foil and the second shrink foil are attached to each other such that the at least one vortex shedding element is enveloped by the first shrink foil and the second shrink foil;
wherein the first shrink foil and the second shrink foil fix and position the at least one vortex shedding element in at least one specific position on the tower.

15. The vortex-shedding-device according to claim 14, wherein the first shrink foil and the second shrink foil are welded together.

16. The vortex-shedding-device according to claim 14, wherein the at least one vortex shedding element is made of at least one of polyethylene and foam.

17. The vortex-shedding-device according to claim 14, wherein the vortex-shedding-device reduces vortex-induced-vibrations acting on the tower during at least one of tower-transportation and installation.

18. The vortex-shedding-device according to claim 14, wherein the vortex-shedding-device is at least one of fixed by a first belt close to an upper part of a tower section and fixed by a second belt close to a lower part of the tower section.

* * * * *